US006546504B1

(12) United States Patent
Gabryjelski

(10) Patent No.: US 6,546,504 B1
(45) Date of Patent: Apr. 8, 2003

(54) SYSTEM AND METHOD FOR PROVIDING STREAMING RECORDING AND PLAYBACK OF AUDIO-VIDEO DATA

(75) Inventor: Henry Gabryjelski, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/487,104

(22) Filed: Jan. 19, 2000

(51) Int. Cl.[7] .................. G06F 11/00; G11B 7/00; H04B 1/22
(52) U.S. Cl. .................. 714/8; 714/7; 711/112
(58) Field of Search .................. 714/8, 7; 365/200; 711/112

(56) References Cited

U.S. PATENT DOCUMENTS

| | | | | |
|---|---|---|---|---|
| 5,228,859 A | * | 7/1993 | Rowe | 434/118 |
| 5,592,648 A | * | 1/1997 | Schultz et al. | 360/69 |
| 5,764,877 A | * | 6/1998 | Lomet et al. | 707/3 |
| 5,802,553 A | * | 9/1998 | Robinson et al. | 711/103 |
| 6,317,844 B1 | * | 11/2001 | Kleiman | 714/5 |
| 6,327,674 B1 | * | 12/2001 | Ito et al. | 711/203 |
| 6,334,161 B1 | * | 12/2001 | Suzuki et al. | 709/212 |

OTHER PUBLICATIONS

American National Statdards Institute, SCSI–2 Specification. Jan. 1994.*

* cited by examiner

Primary Examiner—Robert Beausoliel
Assistant Examiner—Yolanda L. Wilson
(74) Attorney, Agent, or Firm—Shook, Hardy & Bacon LLP

(57) ABSTRACT

A system and method provide streaming recording and playback of audio-video ("A/V") data to and from traditionally slow disc storage media such as DVD™-RAM or AS-MO discs. The system and method distinguish between A/V or other data identified as "non-critical", and application data or the like identified as "critical", and writes all critical data to the medium in such a way that if an attempt is made to write the data to a physical area identified as defective, a spare area on the storage medium is sought to which the critical data is written. However, A/V and other non-critical data is written to available physical areas on the storage medium in a linear fashion without regard to whether the available areas are defective, rendering the A/V data subject to loss but increasing the speed of the writing process.

24 Claims, 3 Drawing Sheets

SYSTEM AND METHOD FOR PROVIDING STREAMING RECORDING AND PLAYBACK OF AUDIO-VIDEO DATA

TECHNICAL FIELD

The present invention relates to a system and method for writing and reading data to and from traditionally slow erasable disc drives such as optical or magneto optical drives, and more particularly to a system and method for providing streaming recording and playback of audio-video ("A/V") data and the like to such drives.

BACKGROUND OF THE INVENTION

Conventionally, device firmware for erasable optical and magneto-optical disc drives such as DVD™-RAM and AS-MO drives incorporate defect management systems and methods in which spare physical areas or sectors are employed for storing any data that the drivers attempt to write to sectors of the media that are detected as potentially defective. When a defective sector is detected during the use of one of these known systems, the device typically seeks an available spare area where the data can be stored, maintaining the integrity of the data. Thereafter, when reading the media, the device must physically go to the spare area to seek data written there.

A problem encountered in the use of these conventional devices arises when speed becomes important, e.g. when attempting to stream large amounts of data, such as A/V data, live to the storage media. Because each seek operation performed by a conventional device upon detection of a defective area of a storage medium takes additional time, the speed of such devices slows, rendering streaming recording and playback problematic.

A conventional solution to the problem of slow read/write speeds for DVD™-RAM and AS-MO media and the like resides in providing a buffer between the devices and the system serving as the source or destination of the data. Although this solution represents an improvement over systems that do not employ a buffer, there still exists a discrepancy between the speed required for streaming recording and playback, and the speed at which data can be read from or written to media having defective physical areas. As such, an audio and/or video signal being played back with a conventional buffered system can stutter or freeze when the buffer is exhausted or drops beneath a level sufficient to compensate for the difference between the speed of the drive and that demanded for live streaming by the application.

In order to reduce or eliminate these problems encountered in conventional systems for reading and writing streaming A/V data to traditionally slow disc media such as DVD™-RAM and AS-MO, it is necessary to reduce or eliminate the delay time consumed by the seek operations of conventional defect management systems.

SUMMARY OF THE INVENTION

In accordance with various objects evident to one of ordinary skill in the relevant art from the following description of a preferred embodiment of the invention, a system and method are provided for facilitating the streaming recording and playback of audio-video ("A/V") data to and from traditionally slow storage media such as DVD™-RAM or AS-MO media.

A system and method in accordance with the invention controls the writing of data to a storage medium by a storage medium drive. For data categorized as being of a first type, e.g. application data and the like, the data is written to available physical areas on the storage medium. If an attempt is made to write the first type of data to a physical area identified as defective, the writing step includes seeking a spare area on the storage medium to which the first type of data is written. Although this step increases the time required to complete the writing step, it ensures that all of the data is written to the disc and can be recovered. As such, the integrity of the data is maintained.

For data categorized as being of a second type, e.g. A/V data, the system and method of the present invention provides for writing of the data to available physical areas on the storage medium without regard to whether the available areas are defective. Although this step renders the data subject to loss, it increases the speed of the writing step by avoiding time-consuming seek operations whenever a defective area of the media is detected.

BRIEF DESCRIPTION OF THE SEVERAL VIEWS OF THE DRAWING

A preferred embodiment of the present invention is described in detail below with reference to the attached drawing, wherein.

DETAILED DESCRIPTION OF THE INVENTION

Figure 5:
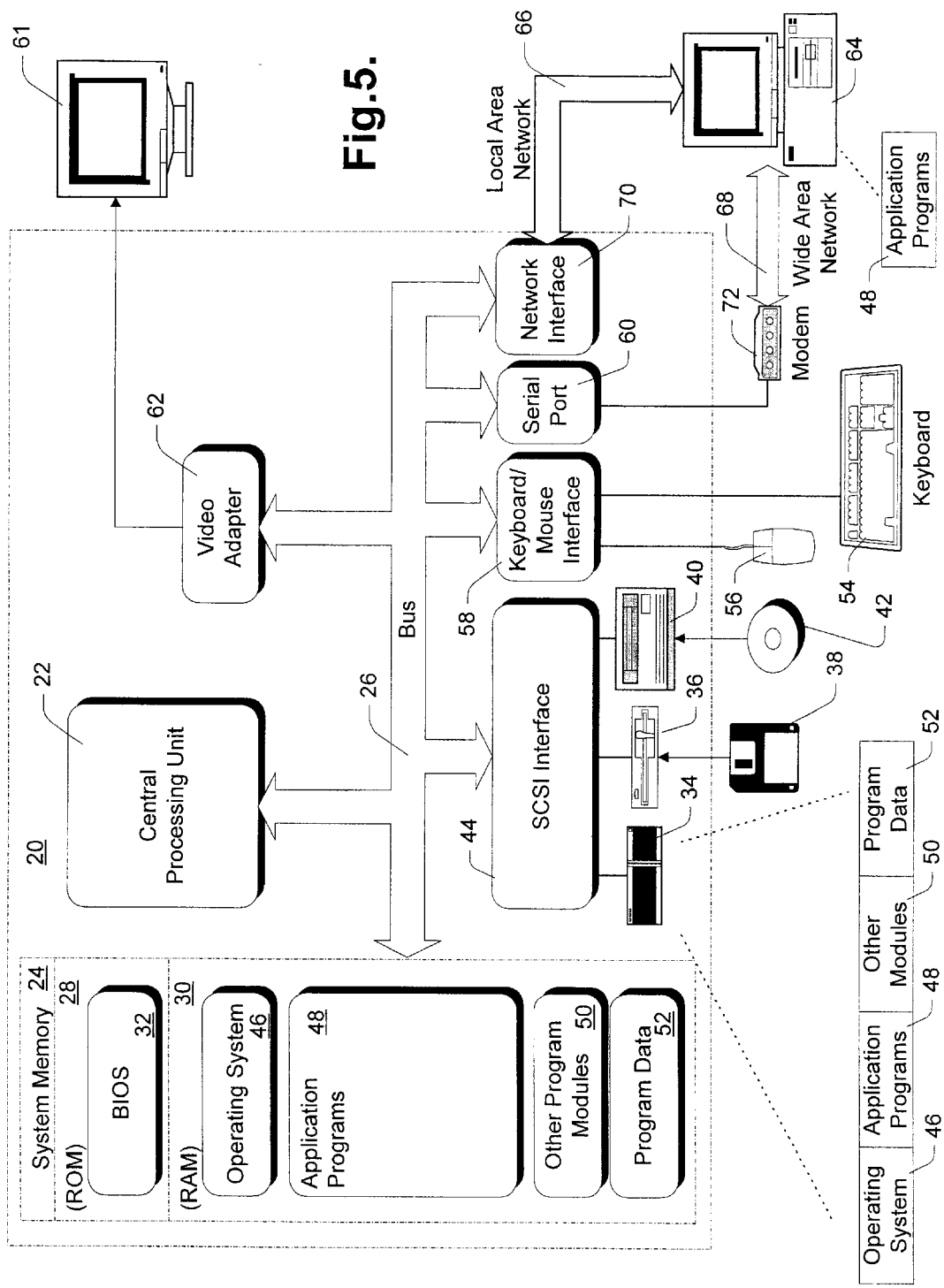
FIG. 5 is a schematic view of an exemplary operating environment in which the invention can be practiced.

An exemplary environment in which the invention may be implemented is illustrated schematically in FIG. 5. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including digital cameras and other handheld devices, multiprocessor systems, microprocessor-based or programmable consumer electronics, network PCs, minicomputers, mainframe computers, and the like.

The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing the invention includes a general purpose computing device in the form of a conventional personal computer 20, including a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. The system memory 24 includes read only memory (ROM) 28 and random access memory (RAM) 30. A basic input/output system (BIOS) 32, containing the basic routines that helps to transfer information between elements within the personal computer 20, such as during start-up, is stored in the ROM 28 of system memory 24.

The personal computer 20 further includes a hard disc drive 34 for reading from and writing to a hard disc, a magnetic disc drive 36 for reading from or writing to a removable magnetic disc 38, and an optical and/or magneto-optical disc drive 40 for reading from or writing to a removable disc 42 such as one marketed under the trademark DVD™-RAM that supports multiple recording capabilities similar in function to magneto optical discs. Alternately, or in addition thereto, the drive 40 may be a magneto-optical drive such as one used with AS-MO media or the like. The drives 34, 36, 40 are connected to the system bus 26 by a small computer system interface (SCSI) 44 or the like. The drives and their associated computer-readable media provide non-volatile storage of computer readable instruction, data structures, program modules and other data for the personal computer 20.

Although the exemplary environment described herein employs a hard disc, a removable magnetic disc and a removable optical disc, other types of computer readable media which can store data that is accessible by a computer, such as magnetic cassettes, flash memory cards, digital video discs, Bernoulli cartridges, random access memories (RAMs), read only memories (ROMs), and the like, may also be used in the exemplary operating environment.

A number of program modules may be stored on the hard disc, magnetic disc, optical disc, ROM or RAM, including an operating system 46, one or more application programs 48, other program modules 50, and program data 52. A user may enter commands and information into the personal computer 20 through input devices such as a keyboard 54 and pointing device 56, both of which are commonly connected to the processing unit 22 through a keyboard/mouse interface 58 that is coupled to the system bus 26. Other input devices may include a digital still or movie camera, a microphone, a joystick, a game pad, a satellite dish, a scanner, or the like. These and other input devices are often connected to the processing unit 22 through a serial port interface 60 that is coupled to the system bus, but may be connected by other interfaces, such as a parallel port, game port or a universal serial bus (USB). A monitor 61 or other type of display device is also connected to the system bus 26 via an interface, such as a video adapter 62. In addition to the monitor, personal computers typically include other peripheral output devices such as speakers and printers.

The personal computer 20 may operate in a networked environment using logical connections to one or more remote computers, such as a remote computer 64. The remote computer may be another personal computer, a server, a router, a network PC, a peer device or other common network node, and typically includes many or all of the elements described above relative to the personal computer 20. The logical connections include a local area network (LAN) and a wide area network (WAN). Such networking environments are commonplace in offices, enterprise-wide computer networks, intranets and the Internet.

When used in a LAN networking environment, the personal computer 20 is connected to the local network through a network interface or adapter 66. When used in a WAN networking environment, the personal computer 20 typically includes a modem 72 or other means for establishing communications over the wide area network, such as the Internet. The modem 72, which may be internal or external, is connected to the system bus 26 via the serial port interface 60. In a networked environment, program modules depicted relative to the personal computer 20, or portions thereof, may be stored in the remote memory storage device. It will be appreciated that the network connections shown are exemplary and other means of establishing a communication link between the computers may be used.

In a preferred embodiment of a system constructed in accordance with the present invention, the operating system 46 includes a file system module and a plurality of device driver modules, wherein the file system module handles incoming read/write requests and instructs the device driver modules to execute the reading and writing operations from and to the respective drives 34, 36, 40 through the SCSI interface 44 or through another appropriate interface. Although the file system module in a preferred embodiment is embedded in an operating system, it is noted that any suitable replacement for the module can be employed that performs those functions of the file system necessary for use by the system of the present invention.

Preferably, in the file system and underlying device drivers, computer-executable instructions are provided for streaming the recording and playback of audio-video ("A/V") data to and from the DVD™-RAM or AS-MO drive 40. The computer-executable instructions generally perform these streaming operations by first distinguishing A/V data from other data, and then using a drop-writing method of writing and reading the A/V data than is used for the other data. The drop-writing method is substantially faster than is possible using conventional seek-writing or reading methods as described in the background of the invention. However, it does subject the A/V data to loss, and for that reason, it is necessary to employ both types of writing and reading operations with the drive depending on the type of data being manipulated.

The term "non-critical" is used herein to describe A/V data or any other data that is to be written or played back from the drive 40 using the drop-writing method, and the term "critical" is used to describe other data such as application data that must be written and read in such a manner that the integrity of the data is maintained. These terms possess no other special meaning and no such special meaning is to be implied.

Figure 2:
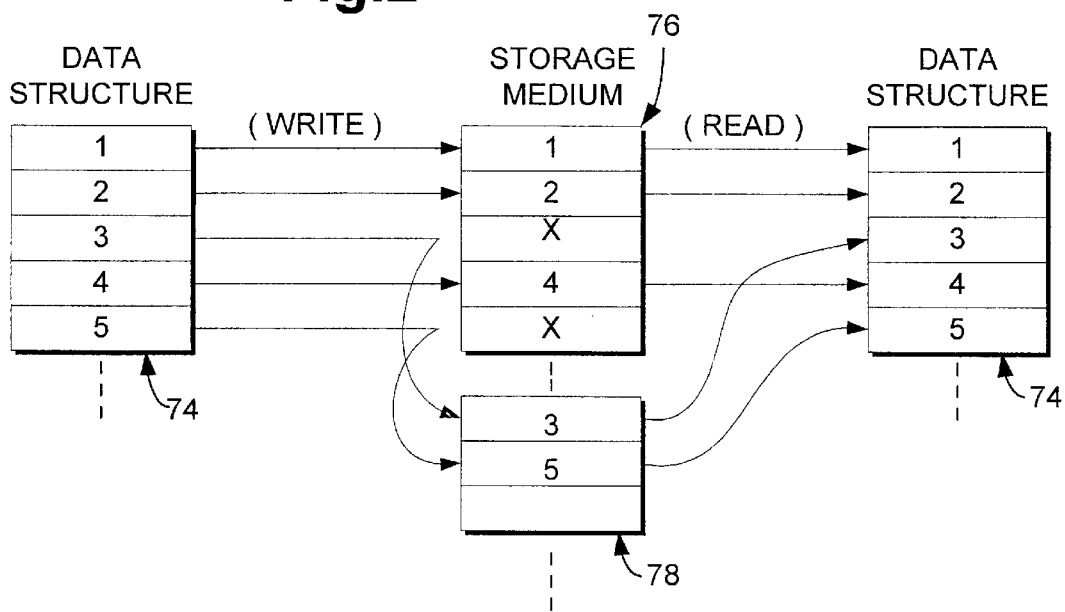
FIG. 2 is a diagram illustrating a write/read operation as implemented with a first type of data in the system and method of the present invention.

As illustrated in FIG. 2, a method of writing critical data in accordance with a preferred embodiment of the present invention includes the steps of writing the data 74, enumerated as data blocks 1–5, to available physical areas 76 on the storage medium. If an attempt is made to write some of the data, e.g. blocks 3 and 5, to a physical area identified by the device driver as defective, indicated by an "X" in FIG. 2, the writing step includes the additional step of seeking spare areas 78 on the storage medium to which the data, blocks 3 and 5, are written The term "seek-writing" is used herein to refer to this type of writing and reading method as employed in a preferred embodiment of the present invention.

With continued reference to FIG. 2, in order to read the critical data from the storage medium, the system reconstitutes all of the data from the medium by reading the data from both the available non-defective areas 76 and from the spare areas 78 where at least some of the data was written. As a result of this "seeking" operation conducted in. connection with data that was written to spare areas of the medium to prevent the loss of data, all of the data, again enumerated as blocks 1–5, is written to and recovered from areas of the medium that are determined to be non-defective.

Figure 3:
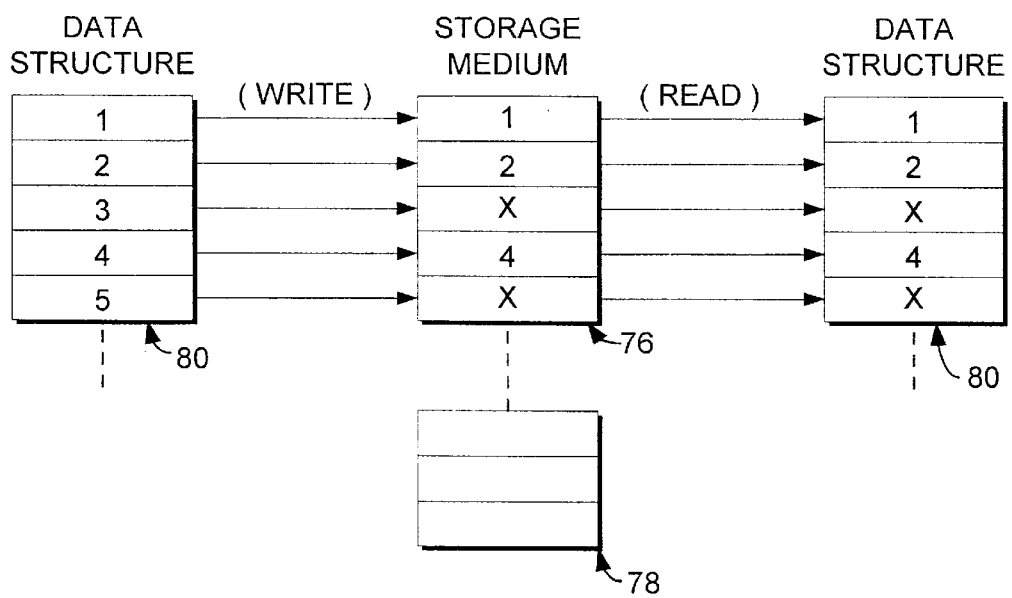
FIG. 3 is a diagram illustrating a write/read operation as implemented with a second type of data in the system and method of the present invention.

In contrast to this method of writing and reading critical data, the drop-writing method employed in the system and method of the present invention writes and reads non-critical data such as A/V data to and from the medium without regard for the physical condition of the medium. As shown in FIG. 3, non-critical data, enumerated as blocks 1–5, is written to the medium by writing the data to available physical areas 76 without seeking spare areas 78 when an area 76 detected as defective is encountered. As a result, if some of the data, e.g. blocks 3 and 5, is written to areas detected as being defective, the data written to those areas is subject to loss.

When the non-critical data is later read from the medium, the data is read from the areas to which it was written, again without seeking data from spare areas, rendering the data written to the defective areas, e.g. blocks 3 and 5 in the illustrated example, subject to loss.

Some conventional storage systems store information concerning the identification of areas of a disc known to be bad. In one optimization of the present invention, this information can be used by the system to prevent A/V data from being written to "known bad" areas. In this exemplary implementation of the invention, the "known bad" area of the media is not allocated for A/V storage by the file system. Thereafter, when the A/V data is read from the medium, the "known bad" area is not read, but rather is skipped. By providing this arrangement, the integrity of the data is theoretically improved. However, the system will continue to write A/V data to areas of the disc that may be bad, but that are not identified by the storage system as "known bad."

Figure 1:
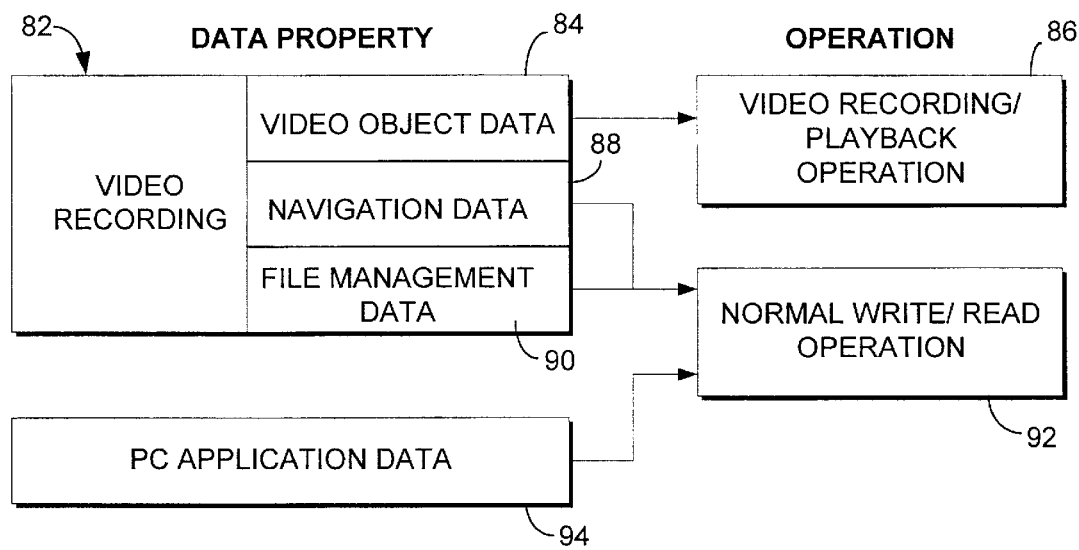
FIG. 1 is a block diagram illustrating a preferred implementation of a system and method for writing and reading data in accordance with the present invention.

In order to carry out writing and reading of data in accordance with the present invention, the data is first categorized, e.g. by the file system of the operating system, as being either critical or non-critical depending on the properties of the data. Turning to FIG. 1, a diagram is provided which illustrates a preferred manner in which data is categorized as either critical or non-critical by the system. With reference to data 82 produced in the process of a video recording, A/V object data 84 is categorized as non-critical and is written to and read from the storage medium using the drop-writing method 86 illustrated in FIG. 3, and other data associated with the recording such as navigation data 88 and file management data 90 are categorized as critical and are written to and read from the medium by the seek-writing method 92 shown in FIG. 2. All other data, such as application data 94 and the like, being written to and read from the storage medium is categorized as critical, and is written and read using the seek-writing method 92.

Figure 4:
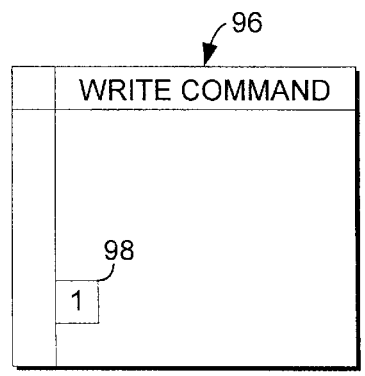
FIG. 4 is a table illustrating a write command employed in a preferred embodiment of the present invention, wherein the command includes a bit utilized for identifying data as being of either a first or second type.

Once data to be written to the storage medium has been categorized, a command is generated by the system, e.g. by the device driver, which is preferably based on a SCSI-2 command WRITE(10). the command instructs the drive to write the data to the storage medium using either the drop-writing method or the seek-writing method. As shown in FIG. 4, the command 96 preferably includes a parameter such as an available bit 98 of information that is either left a "0" to indicate that the data is critical, or is set to a value of "1" to indicate that the data is non-critical. The bit is referred to herein as a streaming bit, and instructs the device driver to employ the drop-writing method of writing the data to the medium when set to "1", substantially increasing the speed with which the data can be written and read, but subjecting the data to loss, as described herein.

An exemplary operation of a preferred system constructed in accordance with the present invention will now be described with reference to the drawing. With initial reference to FIG. 1, assuming that the DVD™-RAM or AS-MO drive is to be used to store application data 94 and the like, the data is categorized as critical and the device driver produces a write command to the drive, wherein the streaming bit 98, shown in FIG. 4, is set to a value of "0". The driver reads the data structure of the write command, recognizes that the streaming bit is not set, and thus employs the seek-writing method 92, the steps of which are illustrated in FIG. 2, to write the data to the medium. Thus, if during writing of the data to the medium, the drive detects a defective physical area 76 of the medium, the data to be written to the area is instead written to a spare area 78 provided on the medium. Thereafter, if the data is read from the medium, the device driver seeks any data stored on spare areas 78 of the medium so that all of the data is recovered without loss.

Returning to FIG. 1, if a video recording is to be written to the DVD™-RAM or AS-MO drive, the file system categorizes the video object data 84 of the recording as non-critical, and the navigation data 88 and file management data 90 as critical. The device driver produces write commands to the drive, wherein the command for the navigation and file management data includes a streaming bit set to a value of "0", and wherein the command for video object data 84 includes a streaming bit is set to "1". The drive receives the commands and data, and treats the critical data in the same manner as described above with respect to application data and the like. However, the non-critical data represented by the video object data 84 is written to the medium by the drop-writing operation 86 in accordance with the method steps illustrated in FIG. 3. Specifically, the non-critical data is written to available physical areas 76 on the storage medium without regard to whether the available areas are defective. Thus, if during writing of the data to the medium, the drive detects a defective physical area of the medium, an attempt is still made to write the data to the area 76 instead of to a spare area 78 provided on the medium. Thereafter, if the data is read from the medium, the drive reads any data that was successfully written to the medium without seeking data from spare areas of the medium.

By providing a system and method that employs different writing methods for writing different types of data to a traditionally slow medium such as DVD™-RAM or AS-MO, several advantages are realized over conventional systems and methods employing only a single method. For example, with respect to critical data, these storage media can be used in the same way as is conventional, maintaining the integrity of the data. However, with respect to non-critical data such as A/V data, where there is an interest in increasing the speed with which such data can be recorded to the media, the system and method of the present invention enable streaming of the data at the cost of the data integrity. This trade-off of speed for data integrity of A/V data is acceptable since the system and method of the invention are simple to execute, and in many ways cause the DVD™-RAM or AS-MO media to resemble conventional linear recording media for A/V signals such as digital audio tape ("DAT") or 8 mm tape, wherein wrinkles or other physical defects in the media cause a degradation in the A/V signal viewed during playback.

Another advantage of the system and method of the present invention is that it is backward-compatible with legacy systems. For example, when a legacy system attempts to read A/V data from a defective sector of a medium to which the A/V data was written in accordance with the present invention, the legacy system will seek the data from a spare sector of the medium rather than simply reading the defective area. Although the data will not be found in the spare area, the legacy system works. Further, because the data was subject to loss during writing to the defective area, the result of the read operation may be just as complete as if the data were read by a system constructed in accordance with the invention.

Likewise, by employing a streaming bit value of "0" for both critical and non-critical data when legacy devices are present in the system, the command employed in the system and method of the present invention to write A/V data to a medium in a legacy device functions to write the data to the medium in a conventional fashion, seeking spare areas when defective areas are encountered.

Although the invention has been described with reference to a preferred embodiment as illustrated in the attached drawing figures, it is noted that substitutions may be made and equivalents employed herein without departing from the scope of the invention as recited in the claims.

What is claimed is:

1. A method of controlling the writing of data to a storage medium by a storage medium drive, wherein the data is categorized as being of a first or a second type, the method comprising the steps of:

providing a data structure including the data and a streaming bit that is set at a first value for the first type or a second value for the second type;

for data categorized as being of the first type, writing the data to available physical areas on the storage medium, wherein if an attempt is made to write the first type of data to a physical area detected as defective, the writing step includes the step of seeking a spare area on the storage medium to which the first type of data is written, when said streaming bit is set to said first value; and for data categorized as being of the second type, writing the data to available physical areas on the storage medium without seeking a spare area on the storage medium when an attempt is made to write the second type of data to a physical area detected as defective and said streaming bit is set to said second value.

2. A method as recited in claim 1, wherein the second type of data is audio/video data.

3. A method as recited in claim 1, further comprising the step of transmitting the data structure with the streaming bit to the storage medium drive for writing to the storage medium to control the manner in which the data structure is written to the storage medium.

4. A method as recited in claim 1, wherein the second type of data is non-critical data.

5. A method as recited in claim 1, wherein the first type of data is critical data.

6. A method as recited in claim 1, wherein the storage medium drive is an optical drive.

7. A method as recited in claim 1, wherein the storage medium drive is a magneto-optical drive.

8. A method as recited in claim 1, wherein the storage medium drive is an erasable disc drive.

9. A method as recited in claim 1, wherein the storage medium drive is a magnetic drive.

10. A computer-readable medium having computer-executable instructions for controlling the writing of data to a storage medium by a storage medium drive, wherein the data is categorized as being of a first or a second type, the method comprising the steps of:

providing a data structure including the data and a streaming bit that is set at a first value for the first type or a second value for the second type;

for data categorized as being of the first type, writing the data to available physical areas on the storage medium, wherein if an attempt is made to write the first type of data to a physical area detected as defective, the writing step includes the step of seeking a spare area on the storage medium to which the first type of data is written, when said streaming bit is set to said first value; and for data categorized as being of the second type, writing the data to available physical areas on the storage medium without seeking a spare area on the storage medium when an attempt is made to write the second type of data to a physical area detected as defective and said streaming bit is set to said second value.

11. In an apparatus for controlling the writing of data to a storage medium by a device driver, a computer-readable medium having computer-executable instructions for performing the steps of:

receiving either of two different types of data to be written to the storage medium;

receiving physical structure information about the storage medium from the storage medium drive, the physical structure information including the identification of physical areas of the medium that are defective;

identifying the data as being of a first or a second type;

incorporating the data into a structure along with a streaming bit that is set to a first value for said first type or set to a second value for said second type;

in response to the data being identified as of the first type, directing the storage medium drive to write the data to the storage medium by attempting to write the data to available physical areas on the storage medium, if an attempt is made to write data to a physical area identified as defective, seeding a spare area on the storage medium to which the data can be written, and writing the data that was to be written to the defective area to the spare area so that the data is not dropped; and in response to the data being identified as of the second type, directing the storage medium drive to write the data to the storage medium by writing the data to available areas on the storage medium without seeding a spare area on the storage medium when an attempt is made to write the second type of data to a physical area detected as defective.

12. A computer readable medium as recited in claim 11, further comprising computer-executable instructions for transmitting the data structure with the identification bit to the storage medium drive for writing to the storage medium to control the manner in which the data structure is written to the storage medium.

13. A computer readable medium as recited in claim 11, wherein the second type of data is audio/video data.

14. A computer readable medium as recited in claim 11, wherein the storage medium is an optical disc.

15. A computer readable medium as recited in claim 11, wherein the storage medium is an erasable disc.

16. A computer readable medium as recited in claim 11, wherein the storage medium is a magnetic disc.

17. A computer readable medium as recited in claim 11, wherein the second type of data is non-critical data.

18. A computer readable medium as recited in claim 11, wherein the first type of data is critical data.

19. A computer-readable medium having computer-executable instructions for performing the steps of:

receiving either of two different types of data to be written to storage medium, wherein the first type of data is to be written relatively slowly without being subject to loss and the second type of data is to be written relatively quickly and subject to loss;

identifying the data as being of the first or second type;

producing a data structure including the data to be written and at least one streaming bit that is set to a first value when the data is identified as being of the first type and to a second value when the data is identified as being of the second type;

transmitting the data structure with the identification bit the storage medium drive for writing to the storage medium to control the manner in which the data structure is written to the storage medium.

20. A video recording apparatus for recording video data to storage medium, the apparatus comprising:

a camera for generating video data representative of a plurality of images received by the camera; and a computer-readable medium having computer-executable instructions for performing the steps of:

receiving the video data from the camera;

producing a data structure including the video data and at least one streaming bit that is set to a first value when the data is identified as being video data; and in response to the streaming bit being of the first value, writing the video data to available areas on the storage medium without regard to whether the available areas have been identified as defective.

21. A method of communicating between a device driver and a device for storing data on a storage medium, comprising the steps of:

receiving, by the device driver, non-critical data to be written to the storage medium;

issuing, by the device driver, a write command including a first parameter that is set to a first value indicative of the data being non-critical; and receiving, by the device, the write command for controlling the manner in which the non-critical data is written to the storage medium.

22. A method as recited in claim 21, further comprising the step of receiving, by the device driver, critical data to be written to the storage medium, wherein data is identified as being either critical or non-critical and the first parameter of the write command is set to a second value when the data is identified as being of the second type.

23. A method as recited in claim 21, wherein the write command is based on a small computer system interface ("SCSI") command including a streaming bit defining the first parameter.

24. A method as recited in claim 21, wherein the write command is based on a SCSI-2 command WRITE (10) including a streaming bit defining the first parameter.

* * * * *